(12) United States Patent
Chica Lara et al.

(10) Patent No.: US 6,469,226 B1
(45) Date of Patent: Oct. 22, 2002

(54) DELAMINATED MICROPOROUS SOLID

(75) Inventors: Antonio Chica Lara; Urbano Diaz Morales; Vicente Fornes Segui; Avelino Corma Canos, all of Valencia (ES)

(73) Assignee: BP Oil International Limited, London (GB)

( * ) Notice: Subject to any disclaimer, the term of this patent is extended or adjusted under 35 U.S.C. 154(b) by 0 days.

(21) Appl. No.: 09/775,681

(22) Filed: Feb. 5, 2001

Related U.S. Application Data

(63) Continuation of application No. PCT/GB99/02567, filed on Aug. 4, 1999.

(30) Foreign Application Priority Data

Aug. 4, 1998 (ES) .............................. 9801689

(51) Int. Cl.[7] .............................. C07C 5/22; C07C 4/06; C10G 11/05; C01B 39/00; C01B 39/02
(52) U.S. Cl. ...................... 585/739; 585/750; 585/653; 208/120.01; 423/702; 423/703; 423/705; 423/706; 423/718; 423/328.2; 423/329.1; 502/60
(58) Field of Search ................................. 585/739, 750, 585/653; 208/120.01; 423/702, 703, 705, 706, 718, 328.2, 329.1; 502/60

(56) References Cited

U.S. PATENT DOCUMENTS

| 4,397,825 A | * | 8/1983 | Whittam ..................... 423/326 |
|---|---|---|---|
| 4,761,391 A | | 8/1988 | Occelli |
| 4,791,088 A | * | 12/1988 | Chu et al. .................... 423/326 |
| 5,266,541 A | * | 11/1993 | Kresge et al. ........... 423/328.2 |
| 5,310,715 A | | 5/1994 | Kresge et al. |
| 6,231,751 B1 | * | 5/2001 | Canos et al. ................. 208/118 |

FOREIGN PATENT DOCUMENTS

| EP | 0 568 741 A1 | | 11/1993 |
|---|---|---|---|
| EP | 0678325 A1 | * | 10/1995 |
| WO | 97/17290 | | 5/1997 |

* cited by examiner

Primary Examiner—Walter D. Griffin
(74) Attorney, Agent, or Firm—Nixon & Vanderhye

(57) ABSTRACT

The invention concerns a microporous oxide material ITQ6, with a characteristic X-ray diffraction pattern, and surface areas for which microporous surface area may be of at least 20 $m^2/g$ the external surface area may be at least 350 $m^2/g$ and the total surface area may be at least 400 $m^2/g$. It may be made via preparation of gel, its hydrothermal treatment, and the treatment of the resulting material with a swelling solution followed by at least partial delamination e.g., by mechanical agitation or ultrasonics. The final oxide material is calcined and, in its acid form or combined with metals, especially noble metals, is useful as catalyst for the isomerization of n-butene to isobutene, or in dewaxing and isodewaxing processes and as a catalytic cracking catalyst or as an additive in FCC catalysts.

34 Claims, 2 Drawing Sheets

DELAMINATED MICROPOROUS SOLID

This is a continuation of PCT application No. PCT/GB99/02567, filed Aug. 4, 1999, the entire content of which is hereby incorporated by reference in this application. The PCT International Application was published in the English language on Feb. 14, 2000.

This invention relates to an inorganic oxide, its process of preparation, catalysts which contain it and its use in hydrocarbon conversion processes such as isomerisation, dewaxing, isodewaxing processes and cracking processes.

BACKGROUND OF THE INVENTION

Laminar materials such as clays which expand in the presence of water are capable, in suitable conditions, of being intercalated with organic and/or inorganic substances with the object of separating their lamellae in such a way that the forces which keep them together decrease drastically until they are so weak that agitation is capable of separating them i.e. dispersing them.

The present invention provides an oxide material which in its calcined form has an X-ray diffraction pattern which includes the values shown in Table 3, and surface area characteristics, determined by $N_2$ adsorption desorption, of a microporous surface area of at least 20 $m^2g^{-1}$ and an external surface area of at least 350 $m^2g^{-1}$ or contains micropores and has a total surface area of at least 400 $m^2g^{-1}$ e.g. at least $450^2$/g and an external surface area of at least 350 e.g. at least 400 $m^2$/g. The material, which is hereafter also called ITQ-6, has a microporous structure and elevated external surface area, capable of supporting Brönsted and Lewis acid centres and characterised by its X-ray diffraction pattern and its adsorption properties, and optionally its catalytic properties.

The present invention also provides a process for preparing an oxide material of the, invention, which process comprises at least partially delaminating a product 1 having, after drying, an X-ray diffraction pattern as shown in FIG. 2, with basal spacings and relative intensities as summarized in Table 2.

BRIEF DESCRIPTION OF THE DRAWINGS

The invention will now be described with reference to the accompanying drawings, in which.

Figure 1:
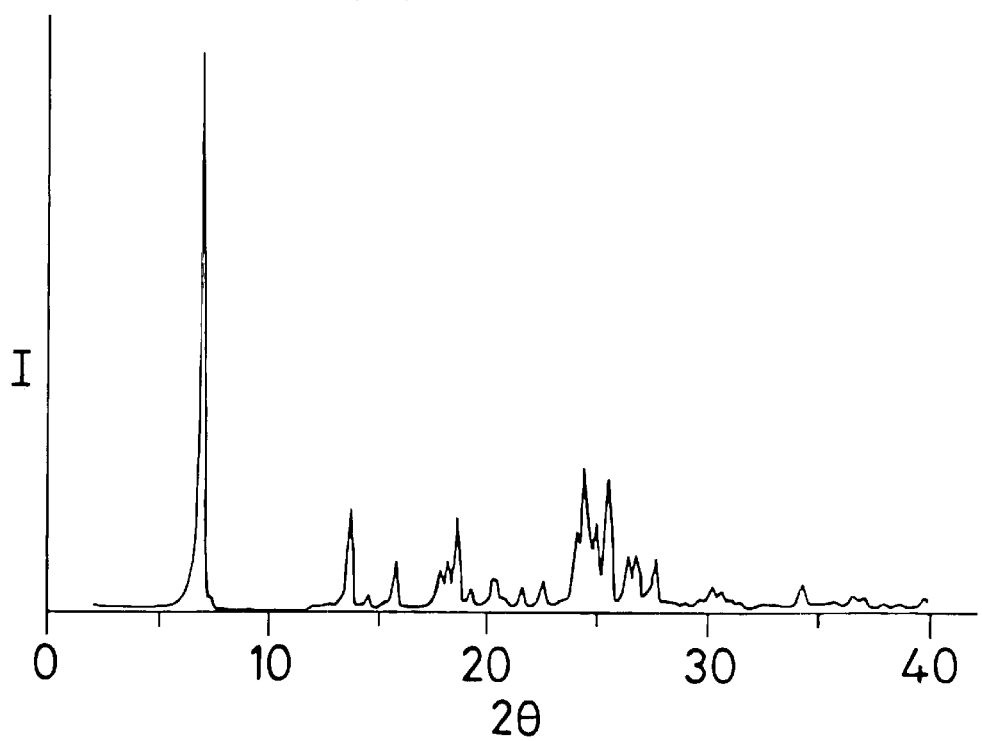
FIG. 1 is an X-ray diffraction pattern of PREITQ6.

The product 1 is preferably a bulked (hereinafter also called swollen) laminar composition, which is made by a process comprising contacting with a bulking swelling solution a precursor hereinafter called PREITQ6 which has an X-ray diffraction pattern as shown in FIG. 1 with basal spacings and relative intensities as summarized in Table 1.

The PREITQ6 is suitably made as a crystalline solid by a synthesis comprising mixing in an autoclave a source of tetravalent metal e.g. X as defined hereinafter, especially silicon, (optionally but preferably a source of a trivalent metal e.g. Y as defined hereinafter especially aluminium), at least one source of fluoride salt and hydrogen fluoride, and an organic nitrogen compound and water and maintaining an elevated temperature to allow crystallization into PREITQ6 to occur.

In a first stage towards production of ITQ6, the PREITQ6 may be made from the source of silica, preferably the source of aluminium, source (or sources) of fluoride salt and HF, and an organic compound (an organic template) and water in suitable proportions. The source of silica may be e.g. a silica powder or an aqueous silica slurry, such as is sold under the Trade Mark "Aerosil", "Cabosil" or "Ludox", or tetraethyl orthosilicate (TEOS) or any other silica source known for making alumino silicates. The source of aluminium may be e.g. an aluminium salt such as a water soluble salt thereof, especially with a strong acid, such as aluminium nitrate $Al(NO_3)_3$ aluminium sulphate $Al_2(SO_4)_3$ or aluminium chloride $AlCl_3$, or aluminium oxide such as boehmite, pseudoboehmite, or any other aluminium source known for making alumino silicates. The fluoride salt is preferably a water soluble salt, especially with a cation capable of thermal decomposition on calcination, such as ammonium fluoride. The hydrogen fluoride may be separately as HF or combined with the fluoride salt e.g. as a bifluoride salt. The organic compound is usually nitrogenous e.g. with 1–4 especially 2–4 nitrogen atoms and in particular with 2–10 carbon atoms, especially 4–8 carbon atoms. The nitrogenous compound may be an aliphatic diamine or triamine such as 1,4-diamino butane, ethylene diamine or may be a cycloaliphatic diamine or triamine such as 1,4, diaminocyclohexane, but is preferably a heterocyclic compound with 1–3 ring nitrogen atoms and optionally O-2 substituent amino groups. The heterorings which may be saturated or unsaturated, fused or unfused, may have 5 or 6 ring atoms, in particular with only carbon ring atoms and one or more nitrogen ring atoms, e.g. 1 or 2, as in pyrrolidine, pyridine, piperazine or piperidine. The ring may carry 0–5 alkyl substituents e.g. of 1–6 carbons, such as methyl or ethyl, especially 2–4 in particular symmetrically disposed on the ring. Examples of such heterocyclic compounds are 1,4-dimethyl piperazine, hexamethylenimine, pyrrolidine, pyridine or preferably 4-amino-2,2,6,6-tetramethyl piperidine. The ingredients used to make the PREITQ6 may be mixed in suitable proportions, e.g. with a silica to alumina molar ratio (especially a Si/Al atom ratio) of at least 5:1, e.g. 5–1000:1, such as 10–500:1 or 20–400:1 e.g. greater than 5:1, 10:1, 30:1 or 40:1 such as 30–500:1 (in particular for atom ratios of X:Y, especially Si:Al).

BRIEF DESCRIPTION OF THE INVENTION

The amount of fluoride salt is usually such that the silica/$NH_4F$ molar ratio is 0.4–0.9 e.g. 0.55–0.75. such as about 0.65 while the amount of hydrogen fluoride is usually such that the silica/HP molar ratio is 0.5–8, e.g. 1–3 such as about 2. The molar ratio of organic compound to silica is usually 0.3–3, such as 0.5–2 e.g. 0.7–1.5 or about 1.

The synthesis of the PREITQ6 can take place at temperatures between 80 and 250° C. e.g. 100 and 200° C., with the gel formed continually agitated and a duration of between 1 and 30 days e.g. 1 to 18 and preferably between 2 and 12 days during which the PREITQ6 is allowed to crystallize. The synthesis is preferably conducted under autogenous pressure. At the end of that time there is a slurry, with pH between 9 and 10, containing a white solid reaction product which is usually washed with distilled water prior to filtration and is then dried, preferably at below 300° C., especially below 200° C. or 100° C.

The product obtained, PREITQ-6, presents an X-ray diagram characteristic of a crystalline solid such as that in FIG. 1, and has basal spacings and relative intensities as summarised in Table 1.

TABLE 1

| d(Å) | I/I₀*100 | d(Å) | I/I₀*100 |
|---|---|---|---|
| 12.71 ± 0.25 | mf | 3.55 ± 0.07 | m |
| 12.00 ± 0.24 | d | 3.47 ± 0.07 | m |
| 7.31 ± 0.14 | d | 3.37 ± 0.07 | d |
| 7.07 ± 0.14 | d | 3.33 ± 0.07 | d |
| 6.93 ± 0.14 | d | 3.22 ± 0.06 | d |
| 6.47 ± 0.13 | d | 3.13 ± 0.06 | d |
| 6.12 ± 0.12 | d | 3.08 ± 0.06 | d |
| 5.82 ± 0.12 | d | 3.01 ± 0.06 | d |
| 5.61 ± 0.11 | d | 2.95 ± 0.06 | d |
| 4.97 ± 0.10 | d | 2.91 ± 0.06 | d |
| 4.86 ± 0.10 | d | 2.88 ± 0.06 | d |
| 4.75 ± 0.10 | m | 2.84 ± 0.06 | d |
| 4.60 ± 0.09 | d | 2.76 ± 0.06 | d |
| 4.38 ± 0.09 | d | 2.71 ± 0.05 | d |
| 4.26 ± 0.09 | d | 2.62 ± 0.05 | d |
| 4.09 ± 0.08 | d | 2.52 ± 0.05 | d |
| 3.93 ± 0.08 | d | 2.47 ± 0.05 | d |
| 3.78 ± 0.08 | d | 2.43 ± 0.05 | d |
| 3.69 ± 0.07 | m | 2.38 ± 0.05 | d |
| 3.64 ± 0.07 | m | 2.26 ± 0.05 | d |

As is well known the actual values of d spacings of crystalline silicate materials may change slightly depending on factors such as crystal size, Si/Al ratio and level of hydration. Such changes are usually ±2% of the value. Thus a 12.71 Angstrom value in Table 1 is 12.71±0.25 Angstrom, so the Table 1 values and those in subsequent Tables 2 and 3 can also be expressed as 12.71, 12.00, 7.31 etc., with the ±2% range being understood.

In this description, unless specified otherwise, the relative intensities of the X-ray diffraction peaks will be represented by the symbols and meaning that are stated below:

| | | |
|---|---|---|
| d . . . | weak . . . | 0–20% relative intensity |
| m . . . | medium . . . | 20–40% |
| f . . . | strong . . . | 40–60% |
| mf . . . | very strong . . . | 60–100% |

Once PREITQ-6 has been obtained, this material is suspended in a solution causing the material to be bulked or swollen. The bulking solution which is usually aqueous, comprises a long-hydrocarbon-chain organic compound (a) which may possess a proton acceptor group, such as one with at least one oxygen or nitrogen atom, for example, a quaternary allylammonium, an amine, or an alcohol with a number of chain carbons which exceeds three especially at least 8, or a quaternary ammonium salt, and in addition the solution contains (b) a controlled quantity of a compound capable of supplying OH to the reaction medium, such as, for example, a quaternary alkylammonium hydroxide or an alkali metal hydroxide such as sodium hydroxide, until a pH exceeding 10 is reached. The organic compound (a) used may be any amine or compound of quaternary alkylammonium, e.g. octyl trimethyl ammonium, dodecyl trimethyl ammonium but preferably cetyltrimethylammonium ($CTMA^+OH^-$) as hydroxide and/or chloride and/or bromide. The organic compound may contain 1–4 e.g. 1 long chain groups e.g. of 8–30 carbons such as 10–20 carbons e.g. cetyl or stearyl, and 3–0 e.g. 3 short chain hydrocarbon groups e.g. alkyl groups such as ones of 1–7 carbons e.g. methyl or ethyl. The compound to supply hydroxide to the reaction medium is preferably organic e.g. an organic quaternary alkyl ammonium hydroxide especially with at least 1 e.g. 1–4 such as 4 alkyl groups of less than 8 carbons such as 1–4 e.g. methyl, ethyl, n-propyl or isopropyl or n-butyl; tetra alkyl ammonium hydroxides such as tetrapropyl ammonium hydroxide is preferred.

Figure 2:
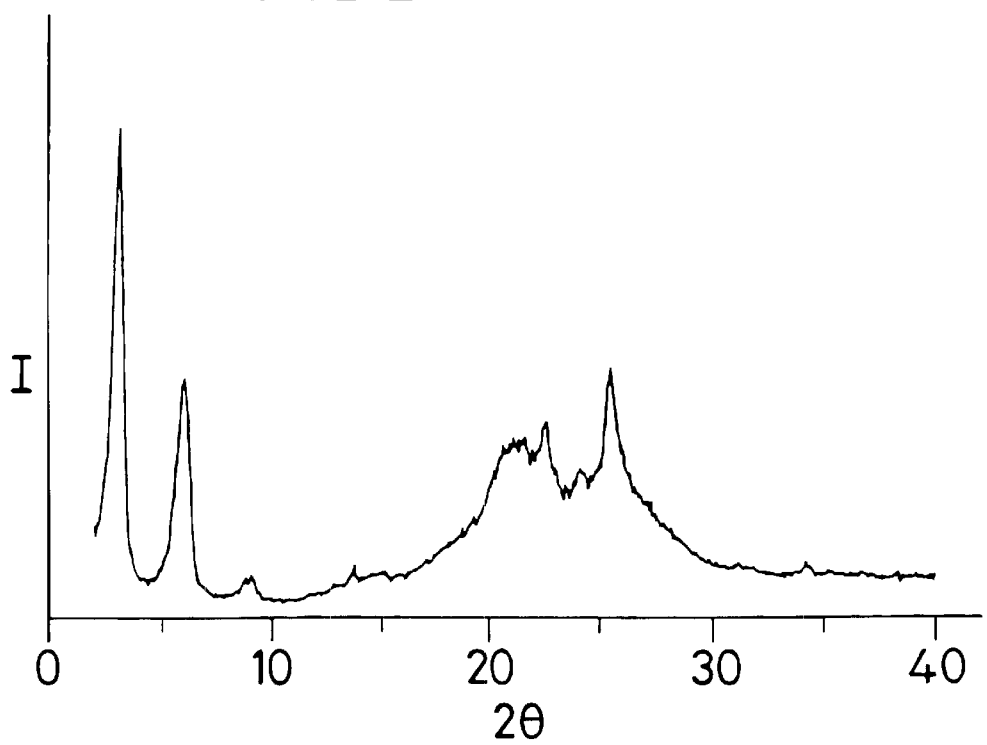
FIG. 2 is an X-ray diffraction pattern of product 1.

Once the bulking solution has been prepared, it is mixed with the PREITQ6 material described previously especially in a ratio by weight of bulking solution to PREITQ-6 of between 4 and 200:1 e.g. 10–50:1. The resulting suspension is maintained, with continual agitation, and preferably with reflux, at a temperature of between 20 and 120° C., and preferably between 40 and 120° C. or 80–110° C., for a period of not less than 1 hour e.g. 1–40 hrs such as 7–25 hrs until the bulked material is obtained. The product obtained is washed exhaustively with water and is dried at temperatures below 300° C. and preferably below 150° C. Once it has been washed and dried, the bulked material presents a characteristic X-ray diffraction pattern which is presented in FIG. 2 and whose basal spacings and relative intensities are summarised in Table 2.

TABLE 2

| d(Å) | I/I₀*100 |
|---|---|
| 28.20 ± 0.56 | mf |
| 14.45 ± 0.29 | f |
| 9.81 ± 0.20 | d |
| 6.46 ± 0.13 | d |
| 4.31 ± 0.09 | m |
| 4.10 ± 0.08 | m |
| 3.93 ± 0.08 | m |
| 3.65 ± 0.07 | d |
| 3.49 ± 0.07 | m |
| 2.87 ± 0.06 | d |
| 2.62 ± 0.05 | d |

As explained above these d spacings can be expressed as e.g. 28.20, with ±2% being understood.

Figure 3:
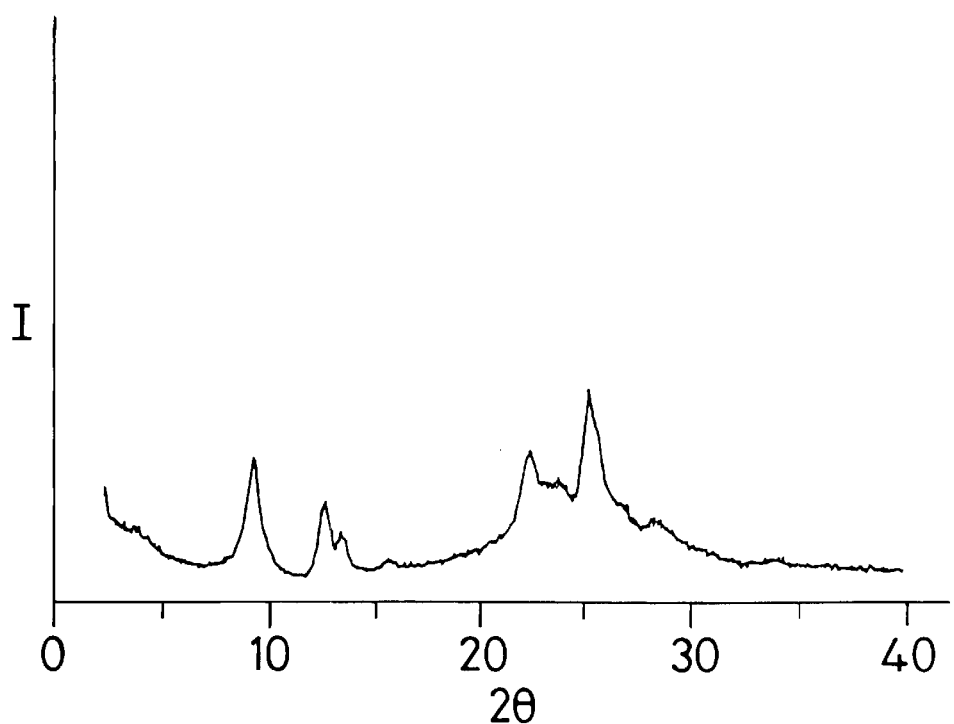
FIG. 3 is an X-ray diffraction pattern of ITQ-6.

The bulked material has separated lamellae and the dispersion of the lamellae of the bulked material is then pursued. To this end, a suspension of the bulked material in water is prepared at a $H_2O$/bulked material Weight ratio of between 4 and 200:1, and preferably between 10 and 100:1 such 20–60:1. This suspension is subjected to a process of controlled agitation to delaminate the bulked material at least partially. The delamination may be by mechanical means, e.g. strong agitation with a stirrer or other paddle wheel, use of electronics such as ultrasonics or spray drying or any other means known in the art for delamination, or by means of lyophilisation or a combination of any of these, for a period of between 0.5 and 100 hrs and, preferably between 1 and 20 hrs. At least partial delamination causes gelling which takes place in the system at the end of this treatment and contributes to increasing significantly the difficulties of filtration. Usually flocculants such as acids e.g. HCl, acetic acid or $HNO_3$ are added in order to facilitate the recovery of the dispersed solid. After the delamination, and any subsequent acid treatment, the product obtained usually undergoes a subsequent stage of hydrothermal (steam) calcination, and optionally a post calcination in the presence of fluorine or a fluorine compound or a treatment with a phosphorus compound. Thus the material obtained in the delamination, especially incorporating acid flocculation, may be dried e.g. at 80–150° C., and is subsequently calcined at temperatures between 300 and 800° C. and, preferably between 400 and 600° C., giving rise to the product called ITQ-6. The material ITQ-6 presents an X-ray diffraction pattern as shown in FIG. 3, with basal spacings and relative intensities summarised in Table 3.

TABLE 3

| d(Å) | I/I$_0$*100 |
|---|---|
| 9.50 ± 0.19 | f |
| 7.10 ± 0.14 | f |
| 6.62 ± 0.13 | m |
| 5.68 ± 0.11 | d |
| 3.97 ± 0.08 | f |
| 3.73 ± 0.07 | f |
| 3.53 ± 0.07 | mf |
| 3.16 ± 0.06 | m |

As explained above, these d spacings can be expressed as e.g. 9.5, with ±2% being understood.

ITQ6 has a laminar character with the lamellae having a microporous internal structure with channels formed by rings of 8 and 10 membered T atoms. The surfaces of the lamellae have a higher external surface area compared to the PREITQ6. ITQ6 has unique structural properties in consequence of possessing both a microporous portion, and an increased external surface area. Table 4 summarises the values obtained by applying the BET equation to the values of the nitrogen adsorption isotherm for calcined ITQ6 compared to uncalcined PREITQ6 at the temperature of liquid nitrogen. In this Table it may be observed that the external surface area of ITQ-6 is eight times higher with respect to that corresponding to PREITQ-6.

TABLE 4

| | S$_{TOT}$ (m$^2$/g) | S$_{MIC}$ (m$^2$/g) | S$_{EXT}$ (m$^2$/g) | V$_{TOT}$ (cm$^3$/g) | V$_{MIC}$ (cm$^3$/g) |
|---|---|---|---|---|---|
| PREITQ6 | 278 | 225 | 53 | 0.1952 | 0.1126 |
| ITQ6 | 512 | 78 | 434 | 0.6474 | 0.0340 |

In the Table 4, S$_{TOT}$ is total surface area, S$_{MIC}$ is the microporous surface area, S$_{EXT}$ is the external surface area, V$_{TOT}$ is the total volume of the pores and V$_{MIC}$ is the volume of the micropores. In this Table 4 micropores are defined as pores with a diameter of less than 15 A or 1.5 nm.

The oxide material of the invention usually has a total surface area of at least 400 m$^2$/g such as 400–700, e.g. 450–650, in particular 500 to greater than 600 such as 500–650 m$^2$/g. Usually it has an external surface area of at least 350 m$^2$/g or at least 380 or at least 400m$^2$/g, such as 400 to at least 540, e.g. 400–500 m$^2$/g. Usually its microporous surface area is at least 20 m$^2$/g but especially at least 40 m$^2$/g, e.g. at least 45 or at least 50 m$^2$/g, such as 50–200 m$^2$/g, e.g. 50–120 or 50–100 m$^2$/g but especially at most 150 at most 100 m$^2$/g. The external (or internal) surface area may be determined directly or by difference between the total and internal (or external) surface areas respectively.

The oxide material of the invention called ITQ-6 usually has a chemical composition represented by the formula

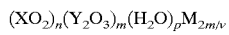

$(XO_2)_n(Y_2O_3)_m(H_2O)_pM_{2m/v}$ where X represents a tetravalent element and Y a trivalent element, n is at least 5 and m may be substantially 0 or at least 0.5 and p is 0–3n, the atomic ratio between X and Y being preferably at least 5, and M represents a cation e.g. hydrogen and/or alkali metal e.g. sodium or alkaline earth metal e.g. calcium of valency v.

Preferably, X in XO$_2$ represents at least one tetravalent element selected from among silicon, germanium and, more specifically, silicon, and may optionally also contain titanium, mixed with Si and/or Ge.

Preferably, Y in Y$_2$O$_3$ represents at least one trivalent element selected from among aluminium, boron, iron, chromium and gallium, and more specifically aluminium.

n is preferably 5 to infinity e.g. 5–2000, such as 10–1000, 20–800, 60–200, such as 80–200 or 60–1000, while m may be 1–5 or preferably 1 but may be substantially zero (in which case the ITQ6 is substantially siliceous).

The microporous oxide of the invention has a structure usually consisting of tetrahedrons of oxygen and atoms of a tetravalent element e.g. X atoms with possibility of introducing surface acidity by the replacement of some X atoms in the lattice by atoms of trivalent metal e.g. Y atoms giving rise to a negatively charged framework which can be compensated by protons giving rise to Brönsted acidity, and/or high charge radius ratio cations such as Al giving rise to Lewis acidity.

The oxide material of the invention may be used as heterogeneous catalysts for organic reactions. The present invention also comprises a catalyst composition comprising the oxide material of the invention, e.g. ITQ6 together with a catalytically active transition metal e.g. of Group VA, VIA, VIIA, VIII especially V, Mo, W or Group VIII, e.g. Ni, Co, Ru, Rh, Pd or Pt or any combination of these; noble metals are preferred. The amount of transition metal may be 0.001–50% such as 0.1–5% (expressed as metal) by weight of the composition such as 1–40% e/g/5–30% Group VIA metal and 0.05–10 e.g. 1–7% Group VIII metal. The metal is preferably capable of fulfilling a catalytic hydrogenating function. The catalyst composition may be prepared by techniques well known in the art e.g. impregnation. The metal may be incorporated into or deposited onto the oxide material in the catalyst composition. The catalyst composition may also comprise a support, in particular a high surface area support e.g. of total surface area at least 250 m$^2$/g, such as alumina, silica or silica/alumina. The metal may be incorporated into the support or deposited onto the support.

The invention also provides a catalyst composition comprising the oxide material of the invention and a matrix, with which the oxide material is mixed; The matrix material may be an active or inactive material and may be either synthetic or naturally occurring. Examples of matrix materials that may be employed in the catalyst composition of the invention include clays (e.g. bentonite and kaolin) and inorganic refractory oxides (e.g. silica, alumina, magnesia, titania, zirconia, silica-alumina, silica-magnesia, silica-titania, silica-zirconia, silica-thoria, silica beryllia as well as ternary compositions such as silica-alumina-thoria, silica-alumina-zirconia, silica-alumina-magnesia and silica-magnesia-zirconia). The relative proportions of the oxide material of the invention and matrix material in the catalyst composition may vary widely. Thus, for example, the catalyst composition may comprise 0.5 to 95%, e.g. 1 to 80% of the oxide material and 5 to 99.5%, preferably 20 to 99% of matrix material, all percentages being by weight based on the combined dry weight of the present oxide material and the matrix. Preferably in the latter catalyst composition with matrix the oxide material is at least partially in acid form.

The catalyst compositions of the invention may be used in a number of hydrocarbon conversion processes. Among these are olefin e.g. alkene skeletal isomerization to branched alkenes and hydrocarbon, e.g. alkane, cracking without or with hydrogen (hydrocracking), in particular with catalyst compositions in which the oxide material is at least partly in acid form, and in dewaxing and isodewaxing of hydrocarbons and in Fluid Catalytic cracking (FCC) operations for cracking hydrocarbons e.g. as an additive especially with catalyst compositions comprising the transition metal. Examples of alkenes isomerized are n-alkenes with 4–8 carbons, such as n-butene and n-pentene, which form branched chain alkenes e.g. isobutene and isopentene. The isomerizations are performed at elevated temperature e.g. at least 200° C., such as 200–500° C., or 300–500° C., and usually at pressures such as 1–10 bar. The hydrocarbon in the hydrocracking process may be a lighter boiling petroleum fraction such as kerosene or a heavier boiling fraction, such as a vacuum distillate or an atmospheric distillate e.g. atmospheric or vacuum gas oil or a residual oil, and the operation is performed at elevated temperatures e.g. at a temperature of at least 300° C. e.g. 300–450° C. and usually at elevated pressure e.g. 10–200 bar. VGO are preferred hydrocarbons for hydrocracking and these may be ones with less than 100 or 50 ppm N e.g. HTVGO or ones with at least 100 ppm or at least 0.05% N compounds, such as gas oils which have not been hydrotreated to lower their N or S contents. The cracking may be performed in the presence or substantial absence of water vapour, e.g. in amount of 0–10% water (by weight of the hydrocarbon) e.g. 0 or 0.1–10% such as 0.1–1%.

The catalytic compositions of the invention may also be used in FCC operations e.g. with the composition as an additive in the reaction, as an FCC catalyst component or as an additive thereto. FCC operations and catalysts are well known in the art. The catalyst may be in an upwardly or downwardly moving catalyst bed, as in Thermofor Catalytic Cracking or FCC processes. The FCC reaction, is usually performed at elevated temperature, such as 400–900 e.g. 450–800 or 500–650° C. and elevated pressure such as 1–10 or 2–7.5 bar, and a catalyst/feedstock weight ratio of 0.1–150:1 e.g. 20–100:1 for use with a moving catalyst.

The transition metal containing catalysts of the invention may also be used in the dewaxing of feed hydrocarbons and the isodewaxing of feed hydrocarbons involving isomerization of linear aliphatic hydrocarbons to branched hydrocarbons, with 1–4 branches. Examples of feed hydrocarbons are linear alkanes of 8–30 carbons such as 10–20 carbons, in particular in lube oil fractions.

The catalytic compositions of the invention can provide improved conversion of feedstocks, or selectivity to the desired products, e.g. branched alkene from isomerization, cracked fraction boiling at less than 410° C. from hydrocracking operations, and branched alkanes from the isodewaxing of hydrocarbons. For example in relation to hydrotreating vacuum gas oil VGO, especially non hydrogenated VGO, selectivities to kerosene and VGO are improved compared to use of known hydrotreating catalysts.

EXAMPLES

The present invention is illustrated in the following Examples.

Example 1

(i) Preparation of the Bulked Laminar Mixed Oxide

This example describes the preparation of a laminar mixed oxide with an Si/Al atom ratio of 5:1 in the initial gel. The laminar oxide was prepared by mixing in an autoclave 10 grams of $SiO_2$ (Aerosil 200, Degussa), 2.3 grams of $Al_2O_3$ (boehmite, Catapal B, Vista Corp., with 73.7% of $Al_2O_3$), 9.2 grams of ammonium fluoride ($NH_4F$, Aldrich of 98% purity), 3.1 grams of hydrofluoric acid (HF, Aldrich at 49.8% concentration), 26 grams of 4-amino-2,2,6,6-tetramethylpiperidine (Fluka of 98% purity) and 27.9 grams of MiliQ deionised water. The synthesis gel obtained with pH between 8 and 9, was maintained in vigorous agitation for one hour at ambient temperature. The resulting mixture was then introduced into autoclaves and maintained therein at 175° C. for five days, at the end of which the resulting product was filtered and washed with 3 liters of deionised water to pH≦9, followed by drying in an oven at 60° C. The product obtained was of laminar material (PREITQ6) having an X-ray pattern as shown in FIG. 1 and basal spacings and relative intensities summarised in Table 1.

One gram (1 gr.) of the laminar material (REITQ-6) obtained was exchanged with a solution prepared with 20 grams of $CTMA^+OH^-$ (29% aqueous solution), 6 grams of tetrapropylammonium hydroxide ($TPA^+OH^-$ 40% aqueous solution) and 4 grams of deionised water. The suspension obtained was maintained, with reflux and vigorous agitation, for 16 hours at 95° C. Finally, the suspension was washed exhaustively with water until the liquid phase was separated from the solid obtained. The bulked laminar material (1.8 grams) presented a diffraction pattern summarised in Table 2.

(ii) Preparation of the Calcined Laminar Material of the Invention

Deionised water (75 ml) was added to the bulked laminar material (1.8 grams) obtained in example 1(i) and the suspension obtained after vigorous agitation was subjected to ultrasonic treatment at a frequency of 50 Hz and a power of 50 watts for 1 hour. Thereafter the solution was recovered by centrifuiging (at 12000 rpm, for 20 minutes), a process which was repeated 4 times. Thereafter the solid material obtained was dried at 100° C. for 16 hr and was finally calcined at 580° C. for 7 hours in the presence of air in order to give a material according to the present invention (1 gram) with a diffractogram diagram like that of FIG. 3 with basal spacings and relative intensities summarised in Table 3, with a specific surface area of 450 $m^2g^{-1}$ according to the BET method, 400 $m^2g^{-1}$ of which corresponds to external surface area, according to the data obtained by the t-plot method, using nitrogen as adsorbate.

Example 2

The process followed in Example 1 was repeated except that the quantities of reagents in stage (i) were varied in order to obtain a gel with an Si/Al atom ratio of 30:1.

The oxide obtained at the end of stage (ii) possessed an X-ray diffraction pattern like that of FIG. 3 and intensities as in Table 3, with a total area of over 500 $m^2g^{-1}$ (namely 562 $m^2g^{-1}$) and an external surface area exceeding 400 $m^2g^{-1}$ (namely 485 $m^2g^{-1}$) and an internal surface area of 77 $m^2g^{-1}$.

Example 3

The process followed in Example 2 was repeated except that only one source of structural atoms namely silicon and oxygen was used in stage (i) and no added aluminium source, thus obtaining at the end of stage (ii) a purely siliceous oxide, without acidity, which gives rise to an X-ray diffraction pattern and relative intensities as in FIG. 3 and Table 3. This pure silica material possesses a total area exceeding 600 $m^2g^{-1}$, between 80 and 90% of which corresponds to external surface area, and between 10 and 20% of which corresponds to internal surface area.

Example 4

The process followed in Example 1 was repeated except that the product suspension obtained after the ultrasonic treatment in (ii) was acidified with 6NHCl, to facilitate the flocculation of the solid in suspension before the separation of the liquid phase from the solid phase.

Once the oxide obtained had been calcined, it presented an X-ray diffraction pattern like that of FIG. 3 with relative intensities comparable to those of Table 3, and a total specific surface area of 580 $m^2g^{-1}$, 500 $m^2g^{-1}$ of which corresponds to external surface area.

Example 5

The process followed in Example 1 was repeated except that in stage (ii), following the ultrasonic treatment, the suspension was lyophilised before the calcination treatment.

Example 6

The first stage of the process described in Example 1 was repeated to give a bulked laminar oxide presenting an X-ray diffraction pattern like that of Table 2.

As a second stage, deionised water (75 ml for 1.8 gr. of the oxide material) was added and the system was maintained in continual agitation, using a Cowles type agitator, for 3 hrs. The suspension obtained was acidified with 6NHCl (pH≅2) and was washed with water and centrifuiged several times to a final pH≧6. Once it had been filtered, dried and calcined at 580° C., the laminar oxide obtained presented an X-ray diffraction pattern like that of Table 3 and a total area of more than 500 $m^2g^{-1}$ (>400 external area and >100 internal area).

Example 7
Catalytic Experiments

Figure 4:
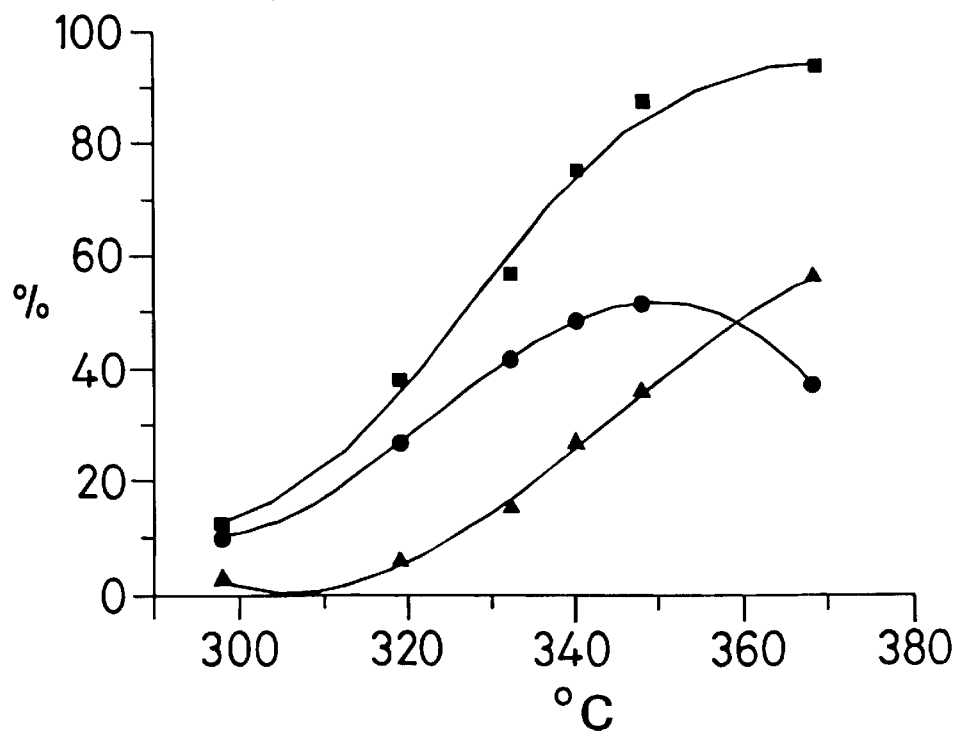
FIG. 4 shows the results of analysis of reactor effluent (the square, circle and triangle symbols showing the conversion, summarization and cracking values, respectively).

A sample of ITQ-6 with an Si/Al atom ratio x30:1 e.g. as made in Ex.2 was subjected to the incorporation, by impregnation, with $H_2PtCl_6$, of 0.5% by weight of platinum (expressed as metal). The final material, after being calcined at 500° C. for 3 hrs, was reduced in a fixed-bed reactor by passing $H_2$ (300 $ml.min^{-1}$) in the presence of hexadecane, the $H_2$/n-hexadecane molar ratio being 50:1. The reaction conditions were: 40 atmospheres of total pressure and reaction temperatures between 290° C. and 370° C. The reactor effluent was collected and analysed and the results obtained, which appear in FIG. 4 and Table 5, show that the catalyst based on ITQ-6 is suitable for carrying out the isodewaxing of hydrocarbons. In FIG. 4, the square, circle and triangle symbols show the conversion, isomerisation and cracking values respectively.

exchanged sample was filtered and washed to eliminate Cl⁻, and dried at 100° C. for 12 hours.

After drying the exchanged sample it was blended with 20 wt % g-$Al_2O_3$ (Merck) and impregnated in 2 steps with Ni and Mo. The first impregnation step with 12 wt % $MoO_3$ (as $(NH_4)_6Mo_7O_{24}.4H_2O$, >99%, Merck), was done following the incipient wetness procedure. The impregnated sample was dried over silica gel for 12 hours and further dried at 100° C. for 2 hours. Then it was impregnated in a second step with 3 wt % NiO (as Ni(NO3)2.6H2O, >99%, Merck) using the incipient wetness method. Again, the sample was dried for 12 hours over silica gel and then at 100° C. during 2 hours.

Finally the NiMo ITQ-6 was calcined in air flow (150 ml/min) using a temperature. program of increasing it from room temperature to 500° C. at 3° C./mins followed by maintenance at 500° C. for 3 hr, and then allowing it to cool to room temperature.

The final sample was pelletised, crushed and sieved to a particle size in the range of 0.25–0.42 mm.

The surface area and micropore size of the parent ITQ-6 and the final catalysts are given in Table 6. The external surface area of the ITQ6 was 576 $m^2$/g.

TABLE 6

| Sample | BET surface area ($m^2$/g) | |
|---|---|---|
| | Total | Micropore |
| ITQ-6 before impregnation | 598 | 22 |
| NiMo/(ITQ-6 + 20% gamma-$Al_2O_3$) | 324 | 46 |

Feedstocks

Two feedstocks oils C and D were used, namely Ca vacuum gas oil conventional untreated straight run vacuum gas oil (~370–530° C. TBP cut) (VGO) of nitrogen content above 500 ppm and D a straight run VGO (~370–530° C. TBP cut) hydrogen pre-treated to <20 ppm nitrogen level HTVGO)

TABLE 5

| Temp. ° C. | % Conversion* | % Isomerisation | % Cracking | % Single branched | % Two-branched | % Three-branched | % Selectivity |
|---|---|---|---|---|---|---|---|
| 298 | 12.07 | 10.33 | 2.37 | 9.09 | 1.13 | 0.11 | 81.33 |
| 319 | 37.72 | 26.97 | 5.75 | 22.04 | 4.44 | 0.49 | 82.43 |
| 332 | 56.72 | 41.57 | 15.15 | 30.76 | 7.99 | 2.82 | 73.29 |
| 340 | 75.22 | 48.54 | 26.68 | 30.71 | 13.95 | 3.87 | 64.53 |
| 348 | 87.41 | 51.60 | 35.81 | 27.56 | 15.62 | 8.42 | 59.03 |
| 368 | 93.84 | 37.49 | 56.35 | 16.14 | 11.43 | 9.92 | 39.95 |

*All the percentages are expressed in moles.
% Single branched, % two branched and % three branched in Table 5 means the percentage of hydrocarbon products having 1, 2, or 3 branches on a linear chain.

Examples 8–10
Catalysts
Commercial Catalysts
A Commercial NiMo hydrotreating catalyst.
B Commercial non noble metal mild hydrocracking catalyst (CoMo).
C Commercial non noble metal second stage hydrocracking catalyst.

The three catalysts, supplied as pellets, were crushed and sieved to a particle size of 0.25–0.42 mm.
Catalyst D The process of Ex.2 was repeated The calcined sample was ion exchanged using a 2M $NH_4Cl$ solution (ml solution/g catalyst=16) at 80° C. for 2 hours. Then the The boiling range distribution of these oils by simulated distillation was as follows

| Feedstock | <140° C. | 140–240° C. | 240–380° C. | 380–410° C. | >410° C. |
|---|---|---|---|---|---|
| VGO | 0.1 | 0.0 | 7.5 | 9.1 | 83.1 |
| HT-VGO | 0.8 | 3.1 | 18.0 | 11.0 | 67.0 |

Reaction System and Reaction Conditions

The reactions have been carried out in a computer-controlled reaction system. The different feedstocks are stored in separated pots and heated at 60° C. They are introduced in the system by means of a piston pump and go through a preheater before entering a fixed-bed tubular reactor, heated by an electric furnace with three independent heating zones. At the outlet of the reactor the liquid sample is collected in another pot, whilst the gases pass through a calibrated mass flow meter, used as a "gas totaliser". The reactions are performed at 60 bar, and the pressure is controlled by a Badger Meter Optipac valve.

The volume of catalyst used was 10 ml, and the feedstock flow was 10 ml/h giving a constant LHSV of 1.

A 4 ml bed (5 cm height) of inert CSi was used below the catalyst bed.

The following experiments have been carried out:

| Catalyst (10 ml) | Cat. weight (g) | Feedstock | Temperatures (° C.) |
|---|---|---|---|
| (blank tests) | — | VGO/HTVGO | 390, 420 |
| A | 7.91 | VGO/HTVGO | 370, 390, 420 |
| B | 6.51 | VGO | 370, 390, 420 |
| C | 8.14 | HTVGO | 370, 390, 420 |
| D | 5.63 | VGO/HTVGO | 370, 390, 420 |

Hydrogen flow was 180 ml/min with gas rate of 1000 nm$^3$/m$^3$ and LHSV=1. Before reaction the catalysts were presulphided in the liquid phase, using 1% v/v Dimethyl disulphide DMDS in light straight run gas oil using the procedure:
(a) dry catalyst at 175° C. for 2 hours, at 30 bar, in H2 flow (90 ml/min).
(b) start oil flow (40 ml/h during the first hour, then 20 ml/h), raise reactor (c)
(c) temperature to 230° C. and hold until H2S breakthrough (>1000 ppm).
(d) raise reactor temperature to 300° C. and hold overnight (~12 hours) with DMDS flow.

Analysis of the Different Products

Gases

The total amount of gases is measured using a calibrated flow controller. Hydrocarbon composition in the gas stream is determined with an flow isonisationdetector DID) after separation in a Plot-Al$_2$O$_3$ capillary column. Hydrogen content is determined separately, using a molecular sieve column connected to a thermal conductivity detector. Concentration of H$_2$S is obtained with a Pulsed Flame Photometric Detector (PFPD).

Liquids

Simulated distillation is carried out using a WCOT Ultimetal 10 meter column connected to an FID, following the D2887 ASTM procedure to give the following cuts: Tb<140° C., 140–240° C., 240–380° C., 380–410° C., Tb>410° C.

Elemental Analysis is used to determine the S and N content of the liquids. The analyser has a sensitivity limit of 0.2 wt % S or N.

Results

Blank Tests

In these tests, instead of catalyst, a 10 ml bed of CSi is introduced in the reactor. Results are included in Table 7:

TABLE 3

| | Blank tests | | | |
|---|---|---|---|---|
| Feedstock | VGO | VGO | HT-VGO | HT-VGO |
| Temperature (° C.) | 390 | 420 | 390 | 420 |
| H2S (wt %) | 0.0005 | 0.0109 | — | — |
| C1 + C2 (wt %) | 0.020 | 0.039 | 0.003 | 0.043 |
| C3 (wt %) | 0.044 | 0.041 | 0.008 | 0.093 |
| i-C4 (wt %) | 0.000 | 0.002 | 0.000 | 0.000 |
| n-C4 (wt %) | 0.036 | 0.035 | 0.005 | 0.058 |
| C5-140° C. (wt %) | 0.146 | 0.952 | 0.814 | 1.170 |
| 140–240° C. (wt %) | 0.599 | 3.693 | 3.799 | 5.086 |
| 240–380° C. (wt %) | 9.985 | 15.971 | 20.594 | 23.038 |
| 380–410° C. (wt %) | 9.985 | 10.581 | 12.096 | 12.267 |
| 410° C.+ (wt %) | 79.184 | 68.675 | 62.682 | 58.244 |
| C1–C4 (wt %) | 0.100 | 0.117 | 0.016 | 0.195 |
| C5–410° C. (wt %) | 20.716 | 31.197 | 37.303 | 41.562 |
| 140–410° C. (wt %) | 20.570 | 30.245 | 36.489 | 40.392 |

Commercial Catalysts

After presulphiding the catalysts, the reaction was carried out at each temperature and for each feedstock until steady state was reached. After stabilisation, conversion and yields were measured, and the reaction temperature was increased from 370° C., first to 390, then to 420° C., and samples of product were taken and analyzed. After this the temperature was returned at 370° C. and samples of product taken and analyzed.

Table 8 shows the steady state results obtained reacting the VGO at 370, 390 and. 420° C. on the commercial catalysts A and C.

TABLE 8

Comparison of NiMo hydrotreating catalyst (A) and CoMo mild hydrocracking catalyst (B). Feedstock: Untreated straight run VGO.

| Catalyst | A | A | A | B | B | B |
|---|---|---|---|---|---|---|
| Temperature (° C.) | 370 | 390 | 420 | 370 | 390 | 420 |
| H2S (wt %) | 1.50 | 2.29 | 2.28 | 1.43 | 1.52 | 1.83 |
| C1 + C2 (wt %) | 0.17 | 0.48 | 1.02 | 0.22 | 0.20 | 0.93 |
| C3 (wt %) | 0.10 | 0.27 | 0.55 | 0.13 | 0.12 | 0.60 |
| i-C4 (wt %) | 0.01 | 0.05 | 0.10 | 0.02 | 0.02 | 0.13 |
| n-C4 (wt %) | 0.06 | 0.16 | 0.31 | 0.08 | 0.07 | 0.33 |
| C5-140° C. (wt %) | 0.64 | 2.07 | 5.04 | 0.69 | 1.25 | 6.20 |
| 140–240° C. (wt %) | 3.34 | 6.47 | 14.61 | 1.86 | 3.92 | 15.33 |
| 240–380° C. (wt %) | 19.42 | 25.61 | 37.71 | 18.92 | 22.73 | 39.58 |
| 380–410° C. (wt %) | 13.05 | 12.18 | 10.31 | 14.11 | 13.33 | 10.64 |
| 410° C.+ (wt %) | 61.71 | 50.44 | 28.07 | 62.54 | 56.83 | 24.44 |

TABLE 8-continued

Comparison of NiMo hydrotreating catalyst (A) and CoMo mild hydrocracking catalyst (B). Feedstock: Untreated straight run VGO.

| Catalyst | A | A | A | B | B | B |
|---|---|---|---|---|---|---|
| Temperature (° C.) | 370 | 390 | 420 | 370 | 390 | 420 |
| C1–C4 (wt %) | 0.35 | 0.95 | 1.99 | 0.45 | 0.42 | 1.98 |
| C5-410° C. (wt %) | 36.45 | 46.33 | 67.67 | 35.58 | 41.23 | 71.75 |
| 140–410° C. (wt %) | 35.81 | 44.26 | 62.63 | 34.89 | 39.98 | 65.55 |
| H2S (g/h) | 0.1281 | 0.1905 | 0.1843 | 0.1210 | 0.1170 | 0.1425 |
| C1 + C2 (g/h) | 0.0146 | 0.0395 | 0.0824 | 0.0182 | 0.0154 | 0.0721 |
| C3 (g/h) | 0.0087 | 0.0226 | 0.0448 | 0.0111 | 0.0094 | 0.0470 |
| i-C4 (g/h) | 0.0013 | 0.0038 | 0.0084 | 0.0017 | 0.0016 | 0.0098 |
| n-C4 (g/h) | 0.0050 | 0.0161 | 0.0254 | 0.0069 | 0.0056 | 0.0255 |
| C5-140° C. (g/h) | 0.0546 | 0.1725 | 0.4083 | 0.0579 | 0.0960 | 0.4824 |
| 140–240° C. (g/h) | 0.2849 | 0.5393 | 1.1827 | 0.1571 | 0.3009 | 1.1928 |
| 240–380° C. (g/h) | 1.6591 | 2.1331 | 3.0534 | 1.5955 | 1.7452 | 3.0789 |
| 380–410° C. (g/h) | 1.1145 | 1.0143 | 0.8349 | 1.1905 | 1.0231 | 0.8275 |
| 410° C.+ (g/h) | 5.2706 | 4.2019 | 2.2726 | 5.2744 | 4.3631 | 1.9010 |
| Total (g/h) | 8.5413 | 8.3307 | 8.0971 | 8.4342 | 7.6773 | 7.7797 |
| Mass Balance | 100.2324 | 97.7604 | 95.0198 | 98.9752 | 90.0931 | 91.2949 |
| % S (E.A.) | 2.00E–01 | 4.73E–02 | 0 | 4.47E–02 | 4.88E–03 | 2.96E–01 |
| % N (E.A.) | 6.51E–02 | 5.29E–02 | 1.98E–02 | 7.60E–02 | 6.80E–02 | n.d. |
| HDS (%) | 92.34 | 98.25 | 100.00 | 98.31 | 99.83 | 89.89 |
| HDN (%) | 72.81 | 78.80 | 92.38 | 68.72 | 74.53 | n.d. |

Temperature profiles were checked along the catalytic bed, and the maximum difference obtained at 420° C. was a difference of 4° C. The results obtained with the hydrotreated feedstock HTVGO are in Table 9.

catalyst A and mild hydrocracking catalyst B for conversion of VGO on one hand, and with the results of the hydrotreating catalyst A and second stage hydrocracking catalysts C for conversion of HTVGO on the other.

TABLE 9

Comparison of NiMo hydrotreating catalyst (A) and zeolitic second stage hydrocracking catalyst (C). Feedstock: HTVGO.

| Catalyst | A | A | A | C | C | C |
|---|---|---|---|---|---|---|
| Temperature (° C.) | 370 | 390 | 420 | 370 | 390 | 420 |
| H2S (wt %) | — | — | — | — | — | — |
| C1 + C2 (wt %) | 0.065 | 0.199 | 0.404 | 0.574 | 1.372 | 2.946 |
| C3 (wt %) | 0.066 | 0.172 | 0.253 | 0.519 | 1.119 | 1.774 |
| i-C4 (wt %) | 0.017 | 0.052 | 0.064 | 0.323 | 0.656 | 1.104 |
| n-C4 (wt %) | 0.054 | 0.118 | 0.146 | 0.267 | 0.491 | 0.709 |
| C5-140° C. (wt %) | 1.896 | 2.728 | 6.193 | 12.015 | 30.573 | 54.070 |
| 140–240° C. (wt %) | 6.979 | 7.250 | 15.440 | 23.848 | 38.209 | 35.040 |
| 240–380° C. (wt %) | 26.519 | 27.311 | 38.106 | 32.449 | 25.568 | 4.079 |
| 380–410° C. (wt %) | 13.559 | 13.606 | 11.184 | 7.17 | 1.341 | 0.185 |
| 410° C.+ (wt %) | 50.845 | 48.564 | 28.209 | 22.089 | 0.670 | 0.093 |
| C1–C4 (wt %) | 0.202 | 0.541 | 0.867 | 1.681 | 3.639 | 6.533 |
| C5-410° C. (wt %) | 48.953 | 50.895 | 70.924 | 76.230 | 95.691 | 93.375 |
| 140–410° C. (wt %) | 47.057 | 48.167 | 64.731 | 64.214 | 65.118 | 39.304 |
| H2S (g/h) | — | — | — | — | — | — |
| C1 + C2 (g/h) | 0.0053 | 0.0155 | 0.0338 | 0.0480 | 0.1113 | 0.2331 |
| C3 (g/h) | 0.0053 | 0.0134 | 0.0212 | 0.0434 | 0.0908 | 0.1403 |
| i-C4 (g/h) | 0.0014 | 0.0041 | 0.0054 | 0.0270 | 0.0532 | 0.0873 |
| n-C4 (g/h) | 0.0044 | 0.0092 | 0.0123 | 0.0223 | 0.0399 | 0.0561 |
| C5-140° C. (g/h) | 0.1545 | 0.2122 | 0.5189 | 1.0061 | 2.4806 | 4.2777 |
| 140–240° C. (g/h) | 0.5688 | 0.5639 | 1.2938 | 1.9969 | 3.1002 | 2.7721 |
| 240–380° C. (g/h) | 2.1613 | 2.1243 | 3.1930 | 2.7170 | 2.0746 | 0.3227 |
| 380–410° C. (g/h) | 1.1050 | 1.0583 | 0.9372 | 0.6629 | 0.1088 | 0.0147 |
| 410° C.+ (g/h) | 4.1438 | 3.7775 | 2.3637 | 1.8496 | 0.0544 | 0.0073 |
| Total (g/h) | 8.1499 | 7.7783 | 8.3793 | 8.3732 | 8.1138 | 7.9113 |
| Mass Balance | 100.2201 | 95.6502 | 103.0410 | 102.9660 | 99.7767 | 97.2861 |

ITQ-6

Tables 10 and 11 compare the results obtained with the ITQ-6 catalyst D with those obtained with the hydrotreating The following conclusions can be drawn from the results in these Ex.8–10 with the catalysts A–D at 3 temperatures and with 2 feedstock.

For the untreated VGO, and consideration of the Net Yield of Product ÷Net Conversion, the ITQ6 gave similar selectivity to naphtha production (bp 120–380) and diesel production (bp 120–380° C.) compared to the catalysts A and B, but better selectivity to kerosene (bp 120–240° C.) and lower selectivity to VGO (bp 380–410) (the latter being advantageous).

For the treated HTVGO, and the same considerations, the ITQ6 gave selectivities of the same order for naphtha, kerosene and diesel, and VGO compared to the hydrocracking catalyst C.

TABLE 10

Comparison of ITQ-6 D with NiMo hydrotreating catalyst (A) and with CoMo mild hydrocracking catalyst B. Feedstock VGO.

| Catalyst | A | A | A | B | B | B | D | D | D |
|---|---|---|---|---|---|---|---|---|---|
| Temperature (° C.) | 370 | 390 | 420 | 370 | 390 | 420 | 370 | 390 | 420 |
| H2S (wt %) | 1.50 | 2.29 | 2.28 | 1.43 | 1.52 | 1.83 | 0.747 | 1.092 | 1.308 |
| C1 + C2 (wt %) | 0.17 | 0.47 | 1.02 | 0.22 | 0.20 | 0.93 | 0.013 | 0.060 | 0.372 |
| C3 (wt %) | 0.10 | 0.27 | 0.55 | 0.13 | 0.12 | 0.60 | 0.017 | 0.034 | 0.263 |
| i-C4 (wt %) | 0.01 | 0.05 | 0.10 | 0.02 | 0.02 | 0.13 | 0.000 | 0.006 | 0.054 |
| n-C4 (wt %) | 0.06 | 0.16 | 0.31 | 0.08 | 0.07 | 0.33 | 0.009 | 0.020 | 0.139 |
| C5-140° C. (wt %) | 0.64 | 2.07 | 5.06 | 0.69 | 1.25 | 6.20 | 0.213 | 0.511 | 2.713 |
| 140–240° C. (wt %) | 3.34 | 6.47 | 14.66 | 1.86 | 3.92 | 15.33 | 1.290 | 2.667 | 10.941 |
| 240–380° C. (wt %) | 19.42 | 25.61 | 37.84 | 18.92 | 22.73 | 39.58 | 13.590 | 17.483 | 29.893 |
| 380–410° C. (wt %) | 13.05 | 12.17 | 10.35 | 14.11 | 13.33 | 10.64 | 9.920 | 10.964 | 10.453 |
| 410° C.+ (wt %) | 61.71 | 50.44 | 28.17 | 62.54 | 56.83 | 24.44 | 74.202 | 67.165 | 43.863 |
| C1–C4 (wt %) | 0.35 | 0.95 | 2.00 | 0.45 | 0.42 | 1.98 | 0.038 | 0.119 | 0.828 |
| C5–410° C. (wt %) | 36.45 | 46.33 | 67.91 | 35.58 | 41.23 | 71.75 | 25.013 | 31.624 | 54.000 |
| 140–410° C. (wt %) | 35.81 | 44.25 | 62.85 | 34.89 | 39.98 | 65.55 | 24.800 | 31.113 | 51.287 |
| % S (E.A.) | 2.00E–01 | 4.73E–02 | 0 | 4.47E–02 | 4.88E–03 | 2.96E–01 | 7.05E–01 | 3.86E–01 | 9.17E–02 |
| % N (E.A.) | 6.51E–02 | 5.29E–02 | 1.98E–02 | 7.60E–02 | 6.80E–02 | n.d. | 1.11E–01 | 1.17E–01 | 1.12E–01 |
| HDS (%) | 92.34 | 98.25 | 100.00 | 98.31 | 99.83 | 89.89 | 73.01 | 86.49 | 96.70 |
| HDN (%) | 72.81 | 78.80 | 92.38 | 68.72 | 74.53 | n.d. | 53.86 | 55.61 | 56.04 |

TABLE 11

Comparison of ITQ-6 D with NiMo hydrotreating catalyst (A) and with second stage hydrocracking catalyst C. Feedstock: HTVGO.

| Catalyst | A | A | A | C | C | C | D | D | D |
|---|---|---|---|---|---|---|---|---|---|
| Temperature (° C.) | 370 | 390 | 420 | 370 | 390 | 420 | 370 | 390 | 420 |
| H2S (wt %) | — | — | — | — | — | — | — | — | — |
| C1 + C2 (wt %) | 0.065 | 0.199 | 0.404 | 0.574 | 1.372 | 2.946 | 0.04 | 0.17 | 0.58 |
| C3 (wt %) | 0.066 | 0.172 | 0.253 | 0.519 | 1.119 | 1.774 | 0.14 | 0.41 | 1.28 |
| i-C4 (wt %) | 0.017 | 0.052 | 0.064 | 0.323 | 0.656 | 1.104 | 0.05 | 0.22 | 0.64 |
| n-C4 (wt %) | 0.054 | 0.118 | 0.146 | 0.267 | 0.491 | 0.709 | 0.10 | 0.25 | 0.54 |
| C5-140° C. (wt %) | 1.896 | 2.728 | 6.193 | 12.015 | 30.573 | 54.070 | 1.83 | 3.24 | 10.58 |
| 140–240° C. (wt %) | 6.979 | 7.250 | 15.440 | 23.848 | 38.209 | 35.040 | 6.47 | 9.56 | 23.40 |
| 240–380° C. (wt %) | 26.519 | 27.311 | 38.106 | 32.449 | 25.568 | 4.079 | 25.68 | 21.88 | 32.16 |
| 380–410° C. (wt %) | 13.559 | 13.606 | 11.184 | 7.917 | 1.341 | 0.185 | 12.04 | 8.58 | 6.74 |
| 410° C.+ (wt %) | 50.845 | 48.563 | 28.209 | 22.089 | 0.670 | 0.093 | 53.64 | 55.69 | 24.07 |
| C1–C4 (wt %) | 0.202 | 0.541 | 0.867 | 1.681 | 3.639 | 6.533 | 0.34 | 1.05 | 3.05 |
| C5–410° C. (wt %) | 48.953 | 50.895 | 70.924 | 76.230 | 95.691 | 93.375 | 46.02 | 43.26 | 72.88 |
| 140–410° C. (wt %) | 47.057 | 48.167 | 64.731 | 64.214 | 65.118 | 39.304 | 44.19 | 40.02 | 62.30 |

We claim:

1. An oxide material which in its calcined form has an X-ray diffraction pattern which includes the values shown in Table 3, and has micropores and surface area characteristics, determined by $N_2$ adsorption desorption, of a total surface area of at least 400 $m^2g^{-1}$ and an external surface area of at least 350 $m^2g^{-1}$.

2. An oxide material according to claim 1 wherein the total surface area is at least 450 $m^2/g$ and an external surface area is at least 400 $m^2/g$.

3. An oxide material which in its calcined form has an X-ray diffraction pattern which includes the values shown in Table 3, and has surface area characteristics, determined by $N_2$ adsorption desorption, of a microporous surface area of at least 20 $m^2g^{-1}$ and an external surface area of at least 350 $m^2g^{-1}$.

4. An oxide material according to claim 3, wherein the microporous surface area is at least 50 $m^2g^{-1}$ and the external surface area is at least 400 $m^2g^{-1}$.

5. A material according to claim 1 comprising the oxides $XO_2$ and $Y_2O_3$, where X represents a tetravalent element and Y represents a trivalent element.

6. A material according to claim 5, where X represents at least one of silicon germanium, and titanium.

7. A material according to claim 5, where Y represents at least one trivalent element selected from the group consisting of aluminium, boron, iron, chromium, gallium and mixtures thereof.

8. A material according to claim 5, where X represents silicon and Y represents aluminium.

9. A material according to claim 5 wherein the molar ratio of $XO_2$ to $Y_2O_3$ is at least 5:1.

10. A material according to claim 5, in which the atomic ratio of X to Y is at least 5:1.

11. An oxide material according to claim 10, in which the atomic ratio of X to Y is greater than 10:1.

12. An oxide material according to claim 5, in which the atomic ratio of X to Y is within a range of between 30 and 500.

13. An oxide material according to claim 1 comprising the oxide $XO_2$, wherein X represents a tetravalent element.

14. An oxide material according to claim 1 whose micro porous surface area is 50–100 $m^2/g$ and whose external surface area is 450 to 600 $m^2/g$.

15. A process for the preparation of an oxide material as claimed in claim 1, which comprises converting into said material a precursor laminar oxide material with an X-ray diffraction pattern shown in FIG. 1 with basal spacing and relative intensities summarized in Table 1.

16. A process according to claim 15 which comprises at least partially delaminating a bulked product of said precursor laminar material.

17. A process according to claim 16 wherein said partial delaminating is performed by mechanical agitation or ultrasonic treatment.

18. A process according to claim 16 wherein the bulked product has been obtained by dispersing said precursor laminar material in a bulking solution comprising an organic compound with a hydrocarbon chain comprising at least three carbon atoms and a proton acceptor group, and a compound capable of supplying hydroxide ion to the dispersion.

19. A process according to claim 18 wherein the precursor laminar material is dispersed in a bulking solution comprising cetyl trimethylammonium hydroxide and tetrapropylammonium hydroxide.

20. A process according to claim 15 wherein the precursor lamina oxide material has been obtained by crystallization from a synthesis mixture comprising a source of silica, optionally a source of aluminium, a salt of fluoride and hydrogen fluoride and 4-amino-2,2,6,6-tetramethylpiperidine and water.

21. A process according to claim 16 wherein at least partial delamination is followed by acid treatment.

22. An oxide material obtained by or obtainable by a process according to claim 15.

23. A catalytic composition, which comprises an oxide material as claimed in claim 1, and at least one transition metal.

24. A composition according to claim 23, which also comprises a support.

25. A composition according to claim 24 wherein the support is alumina, silica or silica/alumina.

26. A composition according to claim 23, wherein the metal has a hydrogenating effect.

27. A composition according to claim 23 wherein the metal is Pt, Pd, Ru, Ni, Co, Mo, V, W, Rh or a mixture of any of these metals.

28. A composition according to claim 27 wherein the metal is Pt.

29. A composition according to claim 27 wherein the metals are Ni and Mo.

30. A catalytic composition which comprises an oxide material as claimed in claim 14, and a matrix.

31. A composition according to claim 30 wherein the matrix is a refractory oxide.

32. A process for isodewaxing a hydrocarbon feed which comprises contacting said feed with a catalyst composition according to claim 23 in the presence of hydrogen at elevated temperature and pressure.

33. A process for catalytic isomerisation of n-alkenes to branched alkenes which comprises contacting said n-alkene with a composition according to claim 23 at elevated temperature.

34. A process for cracking hydrocarbons, which comprises contacting said hydrocarbon with a composition according to claim 23 at elevated temperature and pressure in the presence or absence of water vapour.

\* \* \* \* \*